United States Patent
Caretta et al.

(12)

(10) Patent No.: US 6,409,959 B1
(45) Date of Patent: Jun. 25, 2002

(54) PROCESS FOR MANUFACTURING, MOULDING AND CURING TIRES FOR VEHICLE WHEELS

(75) Inventors: Renato Caretta, Gallarate; Cristiano Bette', Milan, both of (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/365,231

(22) Filed: Jul. 30, 1999

Related U.S. Application Data
(60) Provisional application No. 60/108,887, filed on Nov. 17, 1998, and provisional application No. 60/124,523, filed on Mar. 16, 1999.

(30) Foreign Application Priority Data

Jul. 31, 1998 (EP) .......................................... 98830473.9
Nov. 20, 1998 (EP) .......................................... 98830696.5

(51) Int. Cl.⁷ .............................................. B29C 35/00
(52) U.S. Cl. ..................................... 264/501; 264/326
(58) Field of Search ................................. 264/501, 315, 264/326, 236, 347

(56) References Cited

U.S. PATENT DOCUMENTS

| 1,328,676 A | 1/1920 | Krannich |
| 1,798,210 A | 3/1931 | Laursen |
| 2,795,262 A | 6/1957 | Frank |
| 3,143,449 A | 8/1964 | Bosomworth et al. |
| 3,769,122 A | 10/1973 | Coddington et al. |
| 4,221,253 A | 9/1980 | Seiberling |
| 4,236,883 A | 12/1980 | Turk et al. |
| 4,400,342 A | 8/1983 | Logan |
| 5,127,811 A | 7/1992 | Trethowan |
| 5,597,429 A | 1/1997 | Irie |

FOREIGN PATENT DOCUMENTS

| DE | 355909 | 7/1922 |
| EP | 0242840 | 10/1987 |
| EP | 0780221 A2 | 6/1997 |
| EP | 0822047 A1 | 2/1998 |
| GB | 397508 | 8/1933 |
| WO | WO 98/42499 | 10/1998 |

OTHER PUBLICATIONS

English Language Derwent Abstract of EP 0,242,840.
English Language Abstract of EP 0,242,840.
English Language Abstract of EP 0,822,047 A1.

Primary Examiner—Mathieu D. Vargot
(74) Attorney, Agent, or Firm—Finnegan, Henderson, Farabow, Garrett & Dunner, L.L.P.

(57) ABSTRACT

In a process for manufacturing, moulding and curing tires for vehicle wheels without a vulcanization bladder, many drawbacks can result from a direct contact between the green tire and the fluid under pressure admitted in order to create the necessary pressing of the elastomer material against the vulcanization mould walls. In accordance with the present invention, said drawbacks are avoided by including in the tire manufacturing process a step of treating the inner surface of the green tire in order to prevent the permeation of the fluid under pressure into the inside of the tire structure. Said treatment can be carried out by associating at least one layer of prevulcanized elastomer material with the inner surface of the green tire.

12 Claims, 2 Drawing Sheets

PROCESS FOR MANUFACTURING, MOULDING AND CURING TIRES FOR VEHICLE WHEELS

Applicants claim the right of priority under 35 U.S.C. § 119(a)–(d) based on patent application No. 98830473.9, filed Jul. 31, 1998, in the European Patent Office, and patent application No. 98830696.5, filed Nov. 20, 1998, in the European Patent Office; additionally, Applicants claim the benefit under 35 U.S.C. § 119(e) based on prior-filed, copending provisional application No. 60/108,887, filed Nov. 17, 1998, in the U.S. Patent and Trademark Office, and prior-filed, copending provisional application No. 60/124,523, filed Mar. 16, 1999, in the U.S. Patent and Trademark Office; the contents of all of which are relied upon and incorporated herein by reference.

The present invention relates to a process for manufacturing, moulding and curing tires for vehicle heels. More particularly, the present invention relates to a process for manufacturing, moulding and curing tires for vehicle wheels in which provision is made for admission of a fluid under pressure directly in contact with the green tire, i.e. in the absence of a vulcanization bladder.

In a cycle for vehicle wheel tire production it is provided that, subsequently to a manufacturing process in which the different tire components are made and assembled, a moulding and curing process should be carried out for the purpose of giving the green tire a desired geometrical conformation and a particular tread pattern, and subsequently stabilizing this conformation by vulcanization of the elastomer material forming the tire itself.

For this purpose, the green tire is enclosed in a moulding cavity defined within a vulcanization mould and the shape of which matches that of the outer surface of the tire to be obtained.

Within the scope of the present description, by "green tire" it is intended the product which is obtained after the manufacturing step in which the different tire components are assembled and the elastomer material has not yet been submitted to curing. By "outer surface" it is intended the tire surface which is in sight once said tire has been mounted on the wheel rim, whereas by "inner surface" it is intended the tire surface which is in contact with the inflating fluid of the tire itself.

In one of the most widespread moulding methods it is provided that a vulcanization bladder made of rubber inflated with steam and/or another high-pressure heated fluid should be inserted into the green tire enclosed in the moulding cavity. In this manner the tire is conveniently pressed against the inner walls of the moulding cavity and strengthened into the geometric conformation imposed thereto, as a result of the cross-linking process to which the elastomer material forming the tire itself is submitted. Cross-linking is carried out by virtue of heat supply transferred from steam through the bladder, as well as from the mould walls.

Since the vulcanization bladder is a deformable element due to its own nature, its use involves several drawbacks such as geometric imperfections in the tire as a result of possible distortions undergone by the bladder itself, formation of flashes, in particular at the beads, due to undesired escaping of part of the elastomer material at the starting instants of the vulcanization process. In addition, thermal inertia typical of the material forming the vulcanization bladder represents a hindrance to heat transfer to the tire by the fluid admitted to the bladder itself.

Also known are curing methods in which steam or another heating fluid under pressure is directly admitted to the inside of the tire enclosed in the moulding cavity, in the absence of vulcanization bladder. Moulding methods without the aid of the above mentioned vulcanization bladders are described, e.g., in U.S. Pat. Nos. 4,236,883, 4,400,342, 5,127,811 and 5,597,429.

In accordance with other moulding methods it is provided that, in place of the inflatable vulcanization bladder, a rigid toroidal support having the same configuration as the inner surface of the tire to be obtained should be arranged within the tire itself. For instance, such a method is described in European Patent EP-242,840 in which a rigid toroidal support is employed for imposing the final shape and sizes to the tire enclosed in the mould. According to the above patent disclosure, the different thermal-expansion coefficient between the metallic toroidal support and the elastomer material of which the green tire is made is utilized for achieving an appropriate moulding pressure.

However, the process described in patent EP-242,840 presents many drawbacks in its practical accomplishment. First of all, a very precise and also very difficult control of the volumes of the material employed in manufacturing the tire is required. Besides, it is not possible that an appropriate radial and/or circumferential expansion should be imposed to the tire, for instance in order to achieve desired preloading effects in the reinforcing structures employed in making the same. Finally, obtaining a correct and efficient heat transmission to the tire inside is rather difficult.

In the co-pending European patent application No. 98830473.9, filed on Jul. 31, 1998 in the name of the same Applicant, a moulding and curing process for a tire with the aid of a rigid toroidal support is described, in which the necessary pressing of the raw elastomer material against the mould walls is carried out through the admission of a fluid under pressure into a diffusion interspace created between the inner surface of the green tire and the outer surface of the toroidal support. In this way, during the pressing step a radial expansion is imposed to the tire by effect of the pressurized-fluid admission, with an increase in the tire circumference included between 1.5% and 2.5%, measured at an equatorial plane of the tire itself. The pressurized-fluid admission is preferably carried out by means of feeding channels formed in the toroidal support and terminating at the outer surface of the latter. During the pressurized-fluid admission, the tire is sealingly engaged at its circumferential inner edges, between the walls of the moulding cavity and the outer surface of the toroidal support, so as to hermetically delimit the diffusion interspace at the circumferential inner edges of the tire itself. Advantageously, the admission of heat necessary for vulcanization takes place by admission of a heating fluid into the diffusion interspace. This heating fluid may form or at least be part of the same fluid under pressure utilized for carrying out the pressing step.

In the Applicant's perception, processes without a vulcanization bladder as above described, in which a direct contact between the green tire and a fluid under pressure is provided, can cause many inconveniences due to permeation of the fluid itself into the structure of the tire not yet vulcanized. In fact the fluid permeation may, for example, either cause separations between the adjacent blend layers, or adversely interfere in the adhesion processes between the elastomer material and the metallic or textile reinforcing structures, or even promote corrosion phenomena in the metallic reinforcing materials.

In accordance with the present invention, these inconveniences are avoided by including a treatment step carried out on the inner surface of the green tire in the tire manufacturing process, so that said step prevents the permeation of the fluid under pressure into the tire structure.

Therefore, according to a first aspect, the present invention therefore relates to a process for manufacturing, moulding and curing tires for vehicle wheels, comprising the following steps:

manufacturing a green tire comprising a raw elastomer material;

closing the green tire into a moulding cavity defined inside of a vulcanization mould, said moulding cavity having walls the shape of which matches that of an outer surface of the tire when vulcanization has been completed;

admitting a fluid under pressure into the space defined by an inner surface of the tire in order to press the outer surface of the green tire against the walls of the moulding cavity;

supplying heat to the tire for causing the vulcanization of the raw elastomer material; characterized in that said process, before the stage of admitting fluid under pressure, further comprises a treatment stage to be carried out on the inner surface of the green tire suitable for preventing the permeation of the fluid under pressure into the inside of the tire itself.

In a preferred embodiment, said treatment carried out on the inner surface of the tire is performed by associating at least one layer of prevulcanized elastomer material with the inner surface of the green tire.

In the Applicant's perception, the prevulcanization degree of the layer associated with the inner surface of the tire is suitable for obtaining a sufficient mechanical strength to diffusion and penetration of the fluid under pressure, and at the same time a high fatigue strength, in particular during the first moulding steps of the tire, in order to avoid formation of fissures and cracks.

In more detail, the stage of treating the inner surface of the green tire comprises the following steps: forming at least one layer of a raw elastomer material on an outer surface of a toroidal support the shape of which substantially matches that of the inner surface of the tire; manufacturing the green tire on the toroidal support carrying said layer of raw elastomer material; prevulcanizing the layer of raw elastomer material before introducing the green tire into the vulcanization mould.

Prevulcanization of the elastomer layer is conveniently carried out, at least partly, during manufacturing of the tire on the toroidal support.

In more detail, prevulcanization of the elastomer layer takes place by heat transfer to the elastomer layer itself through heating of the toroidal support.

Preferably, heating of the toroidal support is at least partly achieved by means of the toroidal support itself in a previous moulding and vulcanization cycle of a tire.

According to another preferred embodiment, formation of the layer of raw elastomer material is achieved by applying a vulcanizable liquid composition (in the following referred to as "primer") to the outer surface of the toroidal support.

Preferably, the primer comprises a polymeric base and a vulcanizing system suitable for being active during the green-tire manufacturing step.

According to a third form of embodiment of the present invention, the vulcanizing system which is present in the primer is complete and therefore active already at the moment the primer is applied to the toroidal support.

According to an alternative embodiment of the present invention, the vulcanizing system contained in the primer can be activated only when it is brought into contact with the raw elastomer material constituting the innermost layer of the tire. In this way an undesired prevulcanization of the primer before its application to the toroidal support is avoided. In other words, the primer is stable in time, so that it can be prepared and stored according to the production requirements, even a long time before its real application, this fact making the industrial accomplishment of the process easier.

The primer can be applied either in the form of a solution in a volatile organic solvent through spraying onto the outer surface of the toroidal drum and subsequent evaporation of the solvent, or by dipping the toroidal support into the primer, drawing the toroidal support out of said solution and evaporating the solvent.

According to a preferred form of embodiment, the primer is applied in the form of an aqueous emulsion by immersion or, preferably, by spraying and subsequent evaporation of the solvent (herein, water contained in the emulsion). In this manner, a prevulcanized layer of high compactness and uniformity can be obtained with no need to use any organic solvents which, as known, can create disposal and environmental pollution problems and therefore the application of the process becames inconvenient from an industrial point of view.

Preferably, after the primer has been applied and the solvent evaporated, a layer of elastomer material suitable for ensuring the retention of the tire inflating fluid (commonly referred to as "liner") is applied to the layer of raw elastomer material thus obtained.

Preferably, the liner is previously manufactured in the form of a thin sheet and applied in order to cover the outer surface of the toroidal support.

Application of at least one intermediate layer having the same composition of the liner's composition can be also provided in order to be interposed between primer and liner applications. Application of this intermediate layer is deemed to promote co-vulcanization between primer and liner, thereby greatly improving bonding of the prevulcanized layer to the overlying liner and therefore to the tire as a whole.

In the same manner as with the primer, application of the intermediate layer can take place by spraying or immersion, using either a solution or, preferably, an aqueous emulsion containing the liner blend.

After the treatment of the inner surface of the tire has been accomplished as above described, the subsequent manufacturing, moulding and curing steps are carried out according to the known art.

Further features and advantages will become more apparent from the following detailed description of a preferred form of embodiment of the present invention. Said description will be taken hereinafter, by way of non-limiting example, with reference to the accompanying drawings, in which.

Figure 1:
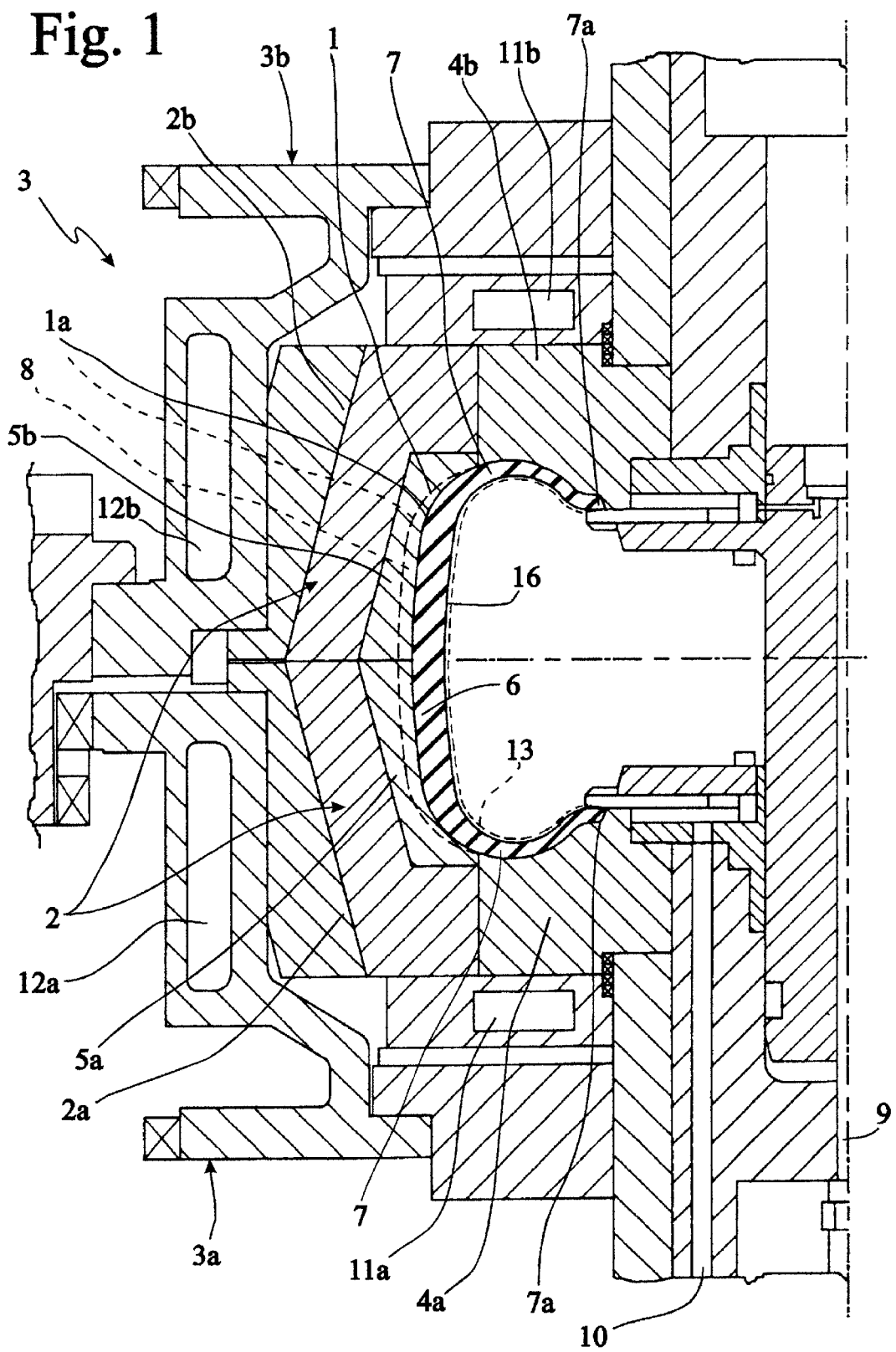
FIG. 1 shows a cross-sectional view of a tire enclosed inside of a vulcanization mould.

Referring particularly to FIG. 1, a tire 1 made of raw elastomer material, previously manufactured in any manner convenient for a person skilled in the art, is enclosed in a vulcanization mould 2 associated with a vulcanization press generally indicated by reference sign 3.

In the shown example mould 2 has a lower half 2*a* and an upper half 2*b* in engagement with a bedplate 3*a* and a closing portion 3*b* of press 3 respectively.

Each of the lower 2*a* and upper 2*b* halves of mould 2 respectively presents a lower 4*a* and an upper 4*b* cheeks, and a crown of upper 5*a* and lower 5*b* sectors.

The lower 2a and upper 2b halves are movable relative to each other between an open condition, in which they are spaced apart from each other in an axial direction, and a closed position, shown in FIG. 1, in which they are close to each other so as to form a moulding cavity 6 the inner walls of which, defined by cheeks 4a, 4b and by sectors 5a, 5b, reproduce the geometric conformation of an outer surface 1a of tire 1 to be obtained.

In more detail, cheeks 4a, 4b are designed to form the outer surfaces of opposite sidewalls 7 of tire 1, whereas sectors 5a, 5b are designed to form the so-called tread band 8 of the tire itself, in which a series of longitudinal and transverse cuts suitably disposed according to a desired tread pattern are created.

On closing mould 2, each of the circumferential inner edges 7a of tire 1 is sealingly engaged against the circumferential inner portions of lower and upper cheeks 4a and 4b, for example, by means of expanding anchoring members (not shown in FIG. 1) which are obtained for example as described in U.S. Pat. No. 5,127,811. Thus tire 1 will be sealingly engaged against the walls of moulding cavity 6, so as to keep outer surface 1a hermetically insulated with respect to an inner surface 1b of the tire itself till when, the moulding and curing cycle being over, the mould itself will be brought again to its open condition.

When the closure of mould 2 has been completed, a fluid under pressure is admitted to the space defined by inner surface 1b of tire 1, and upon the action of this fluid outer surface 1a of the tire is pressed against the walls of moulding cavity 6 so as to cause tread band 8 to be surely and fully penetrated by the raised portions provided in sectors 5a, 5b, thereby determining the correct formation of the tread pattern on the tire.

Concurrently with the admission of the fluid under pressure, the administration of heat to tire 1 is carried out so as to cause the cross-linking of the elastomer material said tire is made of.

Administration of heat to the green tire 1 is advantageously accomplished by admission of a heating fluid, preferably steam under pressure. In conclusion, the heating fluid consists of, or at least comprises, the same fluid under pressure which is employed during the pressing step of outer surface 1a of green tire 1 against moulding cavity 6.

Admission of the steam or of another heating fluid under pressure can be carried out for example via one or more supply channels 9, 10 arranged inside of vulcanization press 3 and opening into moulding cavity 6.

Further steam under pressure can be admitted to cavities 11a, 11b, 12a, 12b formed close to respective cheeks 4a, 4b and sectors 5a, 5b to cause heat transmission from outside of tire 1, through the walls of mould 2.

The process in accordance with the invention involves the execution of a preliminary stage of treating inner surface 1b of tire 1 before the latter is introduced into mould 2, or in any case before the admission of the heating fluid under pressure to the inside of the tire itself.

In more detail, said treatment is put into practice by associating at least one layer of prevulcanized elastomer material, approximatively represented by dashed line 13 in FIG. 1, with inner surface 1b of tire 1.

Figure 2:
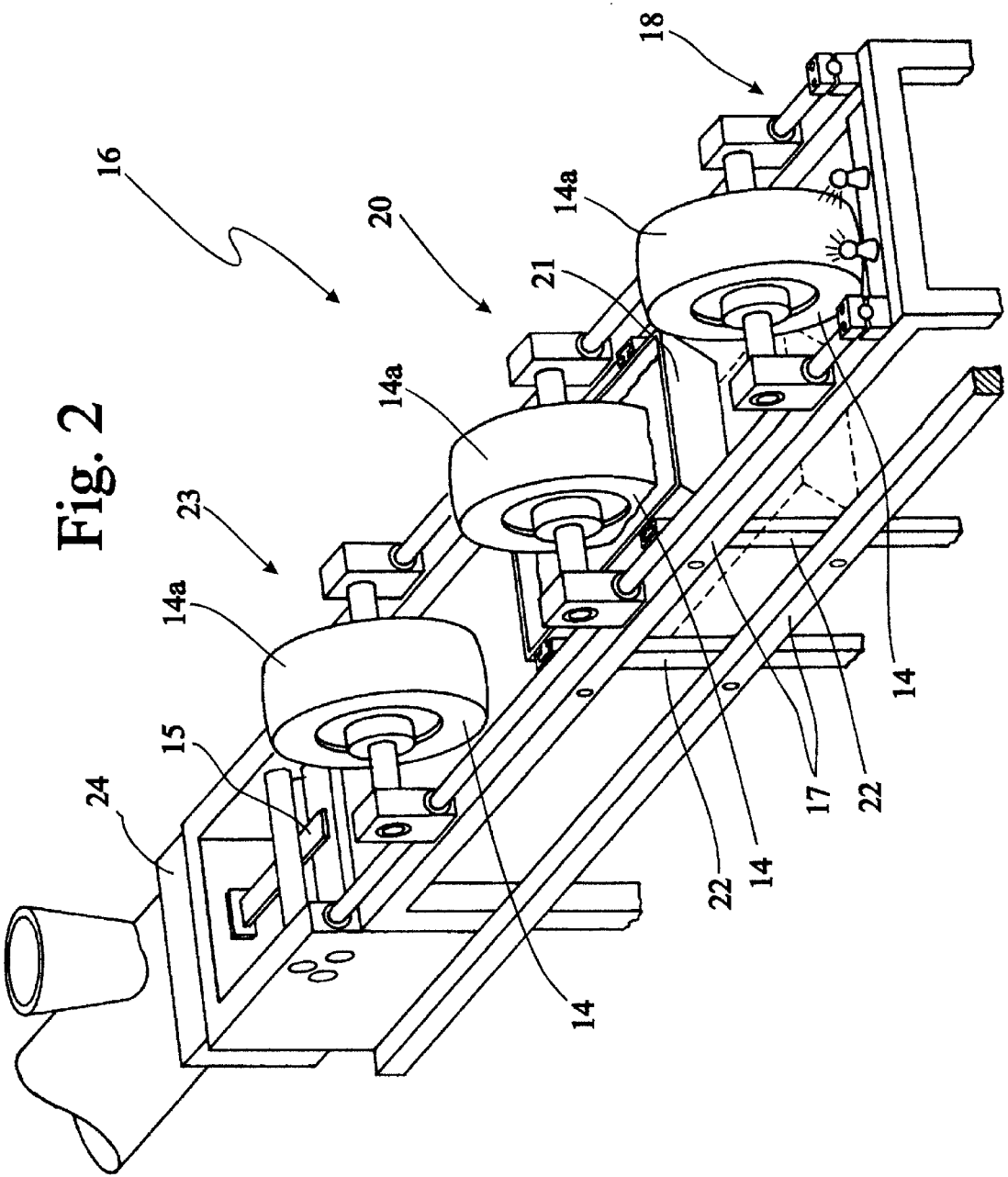
FIG. 2 shows a diagrammatic perspective view of an apparatus to be utilized for carrying out the stage of treating the inner surface of a tire, for accomplishment of the process in accordance with the invention.

Particularly referring to FIG. 2, the stage of treating inner surface 1b is preferably accomplished as a preliminary step of a manufacturing process of tire 1 on a toroidal support 14, for example said manufacturing process being carried out as diclosed in the European patent applications No. 97830633.0 or No. 97830731.2, in the name of the same Applicant, according to which the formation and/or assembling of the different tire components, such as carcass plies, bead reinforcing structures, belt layers, sidewalls and tread band, is directly carried out on a rigid toroidal support the shape of which substantially matches the shape of the inner surface of the tire to be obtained.

According to the invention, the treatment of inner surface 1b of tire 1 can therefore be accomplished by forming or applying to an outer surface 14a of toroidal support 14 at least one layer of elastomer material that, during the following tire manufacturing steps, is prevulcanized until it reaches such a prevulcanization degree, on introduction of tire 1 into vulcanization mould 2, that the permeation of the heating fluid under pressure inside of the tire structure is efficiently prevented.

In order to achieve a sufficient degree of prevulcanization of the primer before tire 1 is introduced into the mould, it is convenient that the elastomer-material mixture which forms the prevulcanized layer is formulated in order to achieve the cross-linking at relatively low temperatures, approximatively not exceeding 150° C., and preferably included between 80° and 120° C., during a period of time not longer than 45 minutes, and preferably included between 20 and 35 minutes.

In order to achieve said result, the primer preferably comprises a polymeric base and a vulcanizing system as hereinafter described.

As a polymeric base, a polymer can be employed which is selected from: natural rubber (NR), epoxy natural rubber (ENR), chloroprene, acrylonitrile-butadiene copolymers (NBR), halogenated butyl rubber (XIIR) (in particular chlorobutyl or bromobutyl rubber), stirene-butadiene copolymer (SBR), isobutilene/p-methyl-stirene copolymers halogenated isobutylene/p-methyl-stirene copolymers, polybutadiene, or mixtures thereof. In case of use of a primer in the form of a solution in an organic solvent, the polymeric base preferably consists of a chlorobutyl rubber and natural rubber mixture, with a ratio by weight XIIR/NR generally included between 40:60 and 90:10. In case of use of a primer in the form of an aqueous emulsion, the polymeric base is preferably selected from: stirene/butadiene copolymers, chloroprene, natural rubber, acrylonitrile-butadiene copolymers or mixtures thereof, for instance a mixture between SBR and NR, with a ratio by weight of SBR/NR generally included between 80:20 and 20:80.

Before application to toroidal support 14 the primer blend can be dissolved in an organic solvent at a concentration included between 10 and 25% by weight. The organic solvent is selected so that primer solutions presenting a low viscosity value are obtained, capable of giving emptying times of the Ford Viscosity Cup No. 4 indicatively included between 10 and 60 seconds (measured following ASTM standard D1200-94), in oder to make application thereof easier and more homogeneous. In addition, the solvent preferably has a high volatility so that it can be easily and quickly eliminated after application of the primer. Appropriate solvents can be selected, for example, in the group comprising: ethyl acetate, octane, cyclohexane, trichloroethylene, toluene, xylenes and the like, or mixtures thereof.

Preferably, the primer is employed in the form of an aqueous emulsion which is, for instance, obtained by mixing the polymeric base in the form of latex with the vulcanizing system, in the presence of surfactants, in order to stabilize the emulsion, and optionally of antisettling agents. Products known in the art for latex stabilization, such as fatty acid salts, alkyl sulfonates and the like can be employed as surfactants. The amount of the polymeric base which is present in the emulsion is generally included between 20 and 60% by weight, preferably between 30 and 50% by weight.

Both for solutions and emulsions, the vulcanizing system comprises at least one vulcanization accelerator selected in the group comprising: dithiocarbamates, thiourames, thiazole compounds, or mixtures thereof.

As vulcanization accelerator, a mixture is particularly preferred which comprises: 1 to 20 phr, preferably 2 to 15 phr, of a dithiocarbamate or thiourame; 0.5 to 10 phr, preferably 1 to 5 phr, of a thiazole compound (phr=parts by weight based on 100 parts by weight of rubber).

In order to further increase the vulcanization speed and/or to decrease the temperature necessary for achieving a sufficient prevulcanization degree, the above stated vulcanization accelerators can be advantageously added with a nitrogen-containing co-accelerator selected for example from the group comprising: N-cyclohexyl-N-ethylamine, diphenylguanidine, and the like, in amounts generally included between 2 and 15 phr, preferably between 5 and 10 phr.

Among dithiocarbamates N,N-dialkyl-dithiocarbamates and zinc, bismuth, cadmium, lead, copper, selenium, tellurium or iron N-alkyl-N-aryl-dithiocarbamates such as: zinc N-phenyl-N-ethyl-dithiocarbamate, zinc N,N-diethyl-dithiocarbamate and the like or mixtures thereof are particularly preferred.

Among the thiazole compounds 2-mercaptobenzothiazole (MBT), 2-mercaptobenzothiazole disulfide (MBTS), N-cyclohexyl-2-benzothiazyl-sulfenamide (CBS), 2-dicyclohexyl-benzothiazyl-sulfenamide (DCBS), N-terbutyl-2-benzothiazyl-sulfenamide (TBBS), N-morpholine-2-benzothiazyl-sulfenamide (MBS), N-terbutyl-dithiobenzothiazole (TBSI) and the like, or mixtures thereof are particularly preferred.

Furthermore fillers commonly employed for sulfur-vulcanized blends such as ZnO, carbon black, kaolin, calcium carbonate, silica, silicates and the like can be added to the primer mixture, as well as vulcanization adjuvants (stearic acid, for example), antioxidants, stabilizers and the like.

In order to avoid that the elastomer material which is employed for forming prevulcanized layer 13 is spontaneously cross-linked before its application to toroidal support 14, preferably sulfur, which is one of the essential components for the vulcanization process, is not added to the primer composition. In this way, the prevulcanization of the primer layer only takes place when the latter is brought into contact with a sulfur-containing vulcanizable mixture, such as the liner one. In fact, the sulfur amount present at the primer/liner interface is deemed to be enough for obtaining a sufficient pre-crosslinking degree of the primer which is capable of enabling the waterproofing of inner surface 1b of tire 1.

A typical composition for a sulfur-free primer to be used in the form of a solution in an organic solvent is the following:

| Component | phr |
| --- | --- |
| Chlorobutyl rubber | 50 |
| Natural rubber | 50 |
| Carbon black | 50 |
| ZnO | 3 |
| Zinc N-phenyl-N-ethyl-dithiocarbarnate | 8 |
| N-cyclohexyl-N-ethylamine | 5 |
| Aromatic oil | 10 |

-continued

| Component | phr |
| --- | --- |
| Stearic acid | 2 |
| 6-PPD | 2 |

In the case of a primer in the form of an aqueous emulsion containing a complete vulcanizing system, a typical composition is the following:

| Component | phr |
| --- | --- |
| SBR/NR | 100 |
| (ratio by weight 70:30 on the dry part) | |
| Carbon black | 5 |
| Kaolin | 10 |
| ZnO | 0.05 |
| 2-mercaptobenzothiazole | 0.1 |
| Zinc N,N-diethyl-dithiocarbamate | 0.1 |
| Potassium caseinate | 0.5 |
| Potassium oleate | 0.5 |
| Sulfur | 0.5 |
| 6-PPD | 2 |

As stated above, after primer application and solvent evaporation, a layer of liner, usually in the form of a thin sheet 15 is preferably applied to the material layer thus obtained in order to cover outer surface 14a of toroidal drum 14.

The liner composition can be selected from those known in the art for this type of tire element. For instance as a polymer base a butyl rubber can be employed, in particular an isobutene/isoprene or an isobutene/p-methyl-stirene copolymer, either in a halogenated form or not. Preferably, the butyl rubber is employed in a halogenated form, optionally mixed with natural rubber (NR), optionally an epoxy natural rubber (ENR), or with a non halogenated butyl rubber. As a vulcanizing system for the liner, for instance sulfur mixed with a thioazole accelerator, for example selected from those stated above, may be used.

As previously shown, in order to improve co-vulcanization between prevulcanized layer and inner surface of the tire, an intermediate layer comprising a vulcanizable composition of the same formulation as that of the liner can be provided for the application over the primer layer and before the application of the liner itself.

A typical composition for the intermediate layer is the following:

| Component | phr |
| --- | --- |
| Bromobutyl rubber | 100 |
| Carbon black | 60 |
| ZnO | 2 |
| Stearic acid | 1 |
| sulfur | 1 |
| MBTS | 2 |
| Aromatic oil | 10 |
| 6-PPB | 0.5 |

Application of the intermediate layer can be achieved for example by rotation of toroidal drum 14, previously treated with the primer, said toroidal drum 14 having its lower part dipped in the solution intended for constituting the intermediate layer itself, and by subsequent solvent evaporation.

For instance, in FIG. 2 is schematically shown an apparatus 16 suitable for forming prevulcanized layer 13 in accordance with the process of the present invention.

Said apparatus 16, which can be conveniently integrated into a tire manufacturing line, comprises a guide structure 17 along which, by any means convenient for a person skilled in the art, one or more toroidal supports 14, on each of which a respective tire 1 is going to be formed, are caused to move forward according to a stepping movement.

Along guide structure 17, each toroidal support 14 encounters a first application station 18 at which the primer, that is present in solution, is supplied to one or more delivery nozzles 19, or equivalent means, in order to be uniformey applicated by spraying to outer surface 14a of the toroidal support itself, which is driven in rotation in any manner convenient for a person skilled in the art.

As shown in FIG. 2, the primer that is present in solution lends itself to be fed to delivery nozzles or equivalent means so as to obtain the uniform application of the same to outer surface 14a of the toroidal support 14 by spraying and subsequent evaporation of the above mentioned solvent, which can be advantageously promoted by heat transfer through toroidal support 14.

To this aim, toroidal support 14 can be submitted to a pre-heating step, which is for instance obtained with the aid of infrared rays. Alternatively, the pre-heating of toroidal support 14 can be achieved through introduction of the same into moulding cavity 6 during a preceding moulding and curing cycle of another tire. Furthermore in this manner the whole apparatus inclusive of vulcanization press 3 and toroidal support 14 can be better utilized as regards heat exploitation.

Downstream of the first application station toroidal drum 14 encounters a possible intermediate station 20 for the application of the above mentioned intermediate layer. In this intermediate station 20, a tank 21 movable on vertical guides 22 and holding the liner components in solution is moved up under toroidal support 14 until the latter is at least partly dipped in the solution itself.

Following to the rotation imposed to drum 14, an uniform application of the liner components in solution to outer surface 14a of the toroidal support itself is obtained.

In this case too, the quick evaporation of the solvents is caused concurrently with the transfer of toroidal support 14 to a second application station 23 where the application of the liner in the form of a thin sheet 15 is carried out.

Thin sheet 15 (liner) can for example come from an extrusion unit 24 placed at second application station 23, so that it lends itself to be applied to cover outer surface 14a of toroidal support 14 immediately after emerging from the extrusion unit.

When application of liner thin sheet 15 has been completed, toroidal support 14 is removed from second application station 23 so as to be submitted, by subsequent transfers to corresponding work stations (not shown as not relevant for the purposes of the invention), to a sequence of operating steps which are provided in the tire manufacturing process.

During the tire manufacture, primer layer 13 is submitted to the prevulcanization process, with the assistance of heat supply which is provided through the toroidal support itself.

In this case too, the heating of the toroidal support in order to transfer heat to primer layer 13 can be achieved by infrared rays or equivalent means, such as electric resistors arranged in the toroidal support itself.

As previously described, if the introduction of toroidal support 14 into moulding cavity 6 together with the tire being worked is provided, the heating of the toroidal support can also be obtained, at least partly, as a result of its use in a moulding and curing cycle which has been previously carried not on another tire.

To the aims of the present invention, in the Applicant's opinion the prevulcanization degree given to primer layer 13 is sufficient if it is able, at the end of tire 1 manufacturing process and at all events on introduction of the tire into vulcanization mould 2, to obtain an imperviousness to steam, or to another heating fluid which is employed, until a pressure of at least 3 bars, preferably of at least 5 bars.

The Applicant has in fact ascertained that the most critical step in connection with spreading of the heating fluid within the elastomer material forming tire 1 appears at the starting instants of the fluid admission inside of the tire, when the pressure exerted by the heating fluid is relatively low (generally lower than 5 bars) and the cross-linking degree of the elastomer material forming the tire is still poor.

On increasing of the heating-fluid pressure, the elastomer material undergoes a kind of compacting, by effect of pressure itself, thereby increasing the the resistance to heat diffusion offered by the material.

Therefore due to the presence of prevulcanized layer 13, steam or any other heating fluid is prevented from penetrating into the whole structure of tire 1, exactly during the most critical steps of the vulcanization process.

Thus any oxidation problem of the metal structures employed in the tire, due to permeation of the steam through the tire itself and/or to formation of gas bubbles when inert gases are employed in addition to or in place of the steam, is eliminated.

Toroidal support 14 which is employed in the previously described example can be removed from tire 1 before its introduction into mould 2. Alternatively, the toroidal support 14 can be left within tire 1, for example for carrying out a vulcanization process as described in the above mentioned co-pending European patent application No. 98830473.9 according to which the heating fluid is admitted to an interspace defined between the outer surface of the toroidal support itself and the inner surface of the tire.

The absence of any rigid or substantially rigid element in contact with the inner surface of the tire during the vulcanization process offers the advantage of obtaining a finished tire with a perfectly smooth and uniform inner surface, without any marks and/or unevennesses typically left by the vulcanization bladders or the toroidal drums employed in the known art. Furthermore, the inner surface of the tire is covered with prevulcanized layer 13 that, when the vulcanization is over, helps in making the tire airtight.

What is claimed is:

1. A process for manufacturing, moulding, and curing a tire, comprising the steps of:

manufacturing a green tire comprising a first elastomer material;

providing an inner surface of the tire with a treatment to prevent permeation of a fluid under pressure through the treatment;

closing the tire into a moulding cavity defined in a vulcanization mould, the moulding cavity including at least one wall;

admitting a fluid under pressure into a space defined by the treatment in order to press an outer surface of the tire against the at least one wall of the moulding cavity; and applying heat to the tire to vulcanize the first elastomer material;

wherein a shape of the at least one wall of the moulding cavity matches a shape of the outer surface of the tire after vulcanization is complete, wherein the treatment comprises at least one layer comprising a second elastomer material, and wherein vulcanization of the second elastomer material only takes place when the second elastomer material is brought into contact with a sulfur-containing vulcanizable mixture constituting an innermost layer of the tire.

2. The process of claim 1, wherein the second elastomer material is sulfur-free.

3. The process of claim 1, wherein the second elastomer material comprises a sulfur-curable polymeric base dissolved in an organic solvent.

4. The process of claim 3, wherein the polymeric base is natural rubber, epoxy natural rubber, chloroprene, acrylonitrile-butadiene copolymers, halogenated butyl rubber, stirene-butadiene copolymers, isobutylene/p-methyl-stirene copolymers, halogenated isobutylene/p-methyl-stirene copolymers, polybutadiene, or mixtures thereof.

5. The process of claim 3, wherein the polymeric base is natural rubber, chlorobutyl rubber, or a mixture thereof.

6. The process of claim 1, wherein the second elastomer material includes a vulcanizing system comprising dithiocarbamates, thiourames, thiazole compounds, or mixtures thereof.

7. The process of claim 6, wherein the vulcanization system further comprises N-cyclohexyl-N-ethylamine or diphenylguanidine.

8. The process of claim 1, wherein the second elastomer material comprises a sulfur-curable polymeric base in an aqueous emulsion.

9. The process of claim 8, wherein the polymeric base is natural rubber, epoxy natural rubber, chloroprene, acrylonitrile-butadiene copolymers, halogenated butyl rubber, stirene-butadiene copolymers, isobutylene/p-methyl-stirene copolymers, halogenated isobutylene/p-methyl-stirene copolymers, polybutadiene, or mixtures thereof.

10. The process of claim 8, wherein the polymeric base is natural rubber, chloroprene, acrylonitrile-butadiene copolymers, stirene-butadiene copolymers, isobutylene/p-methyl-stirene copolymers, or mixtures thereof.

11. The process of claim 8, wherein the second elastomer material includes a vulcanizing system comprising dithiocarbamates, thiourames, thiazole compounds, or mixtures thereof.

12. The process of claim 11, wherein the vulcanization system further comprises N-cyclohexyl-N-ethylamine or diphenylguanidine.

\* \* \* \* \*

UNITED STATES PATENT AND TRADEMARK OFFICE
CERTIFICATE OF CORRECTION

PATENT NO. : 6,409,959 B1
DATED : June 25, 2002
INVENTOR(S) : Caretta et al.

It is certified that error appears in the above-identified patent and that said Letters Patent is hereby corrected as shown below:

Column 11,
Line 14, "stirene-butadiene" should read -- styrene-butadiene --.
Line 15, "methyl-stirene" should read -- methyl-styrene --.
Line 16, "methyl-stirene" should read -- methyl-styrene --.

Column 12,
Line 8, "stirene-butadiene" should read -- styrene-butadiene --.
Line 9, "methyl-stirene" should read -- methyl-styrene --.
Line 10, "methyl-stirene" should read -- methyl-styrene --.
Line 15, "stirene-butadiene" should read -- styrene-butadiene --.
Line 16, "methyl-stirene" should read -- methyl-styrene --.

Signed and Sealed this

Eighth Day of October, 2002

*Attest:*

*Attesting Officer*

JAMES E. ROGAN
*Director of the United States Patent and Trademark Office*